United States Patent [19]

Sandvick, Sr.

[11] 4,039,087

[45] Aug. 2, 1977

[54] PIPE LAYING APPARATUS

[76] Inventor: Robert M. Sandvick, Sr., 11436 S. 51st St., Phoenix, Ariz. 85040

[21] Appl. No.: 742,588

[22] Filed: Nov. 17, 1976

[51] Int. Cl.² ............................................. B63P 19/04
[52] U.S. Cl. ................................... 214/1 PA; 29/237; 254/29 R
[58] Field of Search ................. 214/1 P, 1 PA, 1 R; 254/29 R; 29/237

[56]  References Cited
U.S. PATENT DOCUMENTS

| 3,036,372 | 5/1962 | Vigneron | 214/1 PA X |
| 3,561,615 | 2/1971 | Forsberg et al. | 214/1 P |
| 3,688,378 | 6/1970 | Garvey | 29/237 |

Primary Examiner—Frank E. Werner
Attorney, Agent, or Firm—Cahill, Sutton & Thomas

[57] ABSTRACT

A hydraulic ram is secured to a frame member which includes a pivotally attached scissor clamp for securing the frame member to the outer circumference of a first pipe section. The shaft of the hydraulic ram is extended and retracted by hydraulic fluid under pressure supplied by a hydraulic pump driven by a battery powered electric motor. The shaft is secured to cables which are coupled to an adjacent pipe section. As the shaft retracts, it draws the adjacent section of pipe into longitudinal abutting contact with the first pipe section.

10 Claims, 4 Drawing Figures

PIPE LAYING APPARATUS

BACKGROUND OF THE INVENTION

1. Field of the Invention

This invention relates to pipe laying apparatus and, more particularly, to an apparatus for pulling an adjacent section of pipe into abutting contact with a previously laid pipe section.

2. Description of the Prior Art

Recently OSHA has mandated that contractors who install relatively large pipes in open trenches must use a trench box during the installation process. The trench box consists of a pair of large rectangular steel plates positioned vertically on either side of the trench where a section of pipe is being installed. The vertical dimension of each steel plate must be sufficient to protrude several feet above the upper surface of the trench, while the horizontal dimension of each steel plate must be slightly longer than the length of each pipe section. The vertical positioning and the spacing between each of the rectangular steel plates is maintained by horizontally oriented struts which extend between the upper end portions of the steel plates.

As the pipe-laying operation progresses, the trench box is lifted by a crane to the next area of the trench in which a newly positioned pipe section must be longitudinally aligned and fitted with the previously laid pipe section.

While the trench box increases the safety of workers who are responsible for fitting the abutting sections of pipe together within the trench, it has made the use of a number of prior art pipe laying machines somewhat more difficult.

One prior art pipe laying device is disclosed in the Forsberg patent (U.S. Pat. No. 3,561,615). The Forsberg device requires a telescopically extendable frame, tension springs, and grapples. It must be fitted to adjacent sections of pipe at four points. Since it is longer than a single pipe section, it is frequently difficult to use within a trench box.

A second prior art device for positioning and assembling sections of pipe is disclosed by Vigeneron (U.S. Pat. No. 3,036,372). This mechanism similarly is extremely elaborate and sophisticated. Since it too must be lowered into position from above by a crane and must have a length slightly greater than the length of a single pipe section, a trench box tends to restrict its usefulness.

A third prior art pipe laying apparatus is disclosed in a patent issued to Wiswell (U.S. Pat. No. 3,657,786). The Wiswell apparatus consists of a tripod-like structure, two legs of which are supported by the earth on either side of the trench, while the third leg is supported by the previously laid pipe section. This device is intended for use in underwater pipe laying operations where only very shallow trenches are required. It is not compatible with deep trench pipe laying operations.

As can be seen by a study of the three above mentioned patents, not only is each of these devices difficult to use with a trench box, but each is also bulky, heavy, mechanically complex, and can only be repositioned by a crane or some other similar lifting mechanism. Transporting these devices to the location where pipe sections are to be laid requires either a very large truck or a specially designed trailer. These devices are of such great length that they cannot readily be transported in smaller trucks without substantial disassembly.

Because of the high cost and complexity of prior art pipe laying systems, pipe laying contractors frequently use manual mechanical systems. These mechanical systems typically consist of a chain used in combination with a rachet wrench. A chain is wrapped around the circumference of one pipe and the circumference of a previously laid pipe section. The rachet is manually operated until the two pipe sections are drawn into proper abutting contact.

The use of the chain and rachet combination is very time consuming and requires a number of positioning and fastening steps before it can be activated. Because of the degree of mechanical advantage required, the amount of chain moved over the rachet during each take-up operation is very minimal so that a relatively large number of rachet rotations is required to bring the two abutting sections of pipe into proper alignment.

SUMMARY OF THE INVENTION

It is therefore a primary object of the present invention to provide a comparatively lightweight, totally self-contained pipe laying apparatus which can readily be used in a trench protected by a trench box.

It is another object of the present invention to provide a pipe laying apparatus that may be conveniently positioned and operated by a single individual for moving adjacent sections of pipe into abutting contact.

It is still another object of the present invention to provide a pipe laying apparatus that operates on the outer, top surface of the pipe section.

It is still another object of the present invention to provide a pipe laying apparatus which requires no manually or externally applied force to move adjacent sections of pipe into abutting contact.

It is yet another object of the present invention to provide a pipe laying apparatus which is of a sufficiently small size that it can be transported in the bed of a lightweight pickup truck.

It is yet a further object of the present invention to provide a pipe laying apparatus which has a totally self-contained power source in the form of an electric storage battery.

These and other objects of the present invention will become apparent to those skilled in the art as the description thereof proceeds.

Briefly stated, and in accord with one embodiment of the invention, an elongated frame is positioned approximately parallel to the longitudinal axis of a pipe section above which it is located. Wheels are rotatably mounted on the frame to permit positioning of the frame along the top surface of the pipe section. A bracket is pivotably mounted on an end of the frame. Pipe encircling means secured to the bracket substantially surrounds the outer circumference of the pipe section and includes a scissor clamp which has first and second arms coupled together by a hinge. A hydraulic ram mounted on the frame extends and retracts a shaft to provide movement along an axis substantially parallel to the longitudinal axis of the frame. The ram is hydraulically actuated by hydraulic fluid under pressure supplied by a hydraulic pump driven by a battery powered electric motor. A clevis on the end of the shaft is attached by cables to the next pipe section which is to be aligned with the previously laid pipe section. When the shaft of the hydraulic ram retracts, the adjacent pipe is drawn into abutting contact with the previously laid pipe section.

DESCRIPTION OF THE DRAWINGS

The invention is pointed out with particularlity in the appended claims. However, other objects and advantages together with the operation of the invention may be better understood by reference to the following detailed description taken in conjunction with the following illustrations, wherein:

DESCRIPTION OF THE PREFERRED EMBODIMENT

In order to better illustrate the advantages of the present invention and its contribution to the art, a preferred hardware embodiment of the invention will now be described in some detail.

Figure 1:
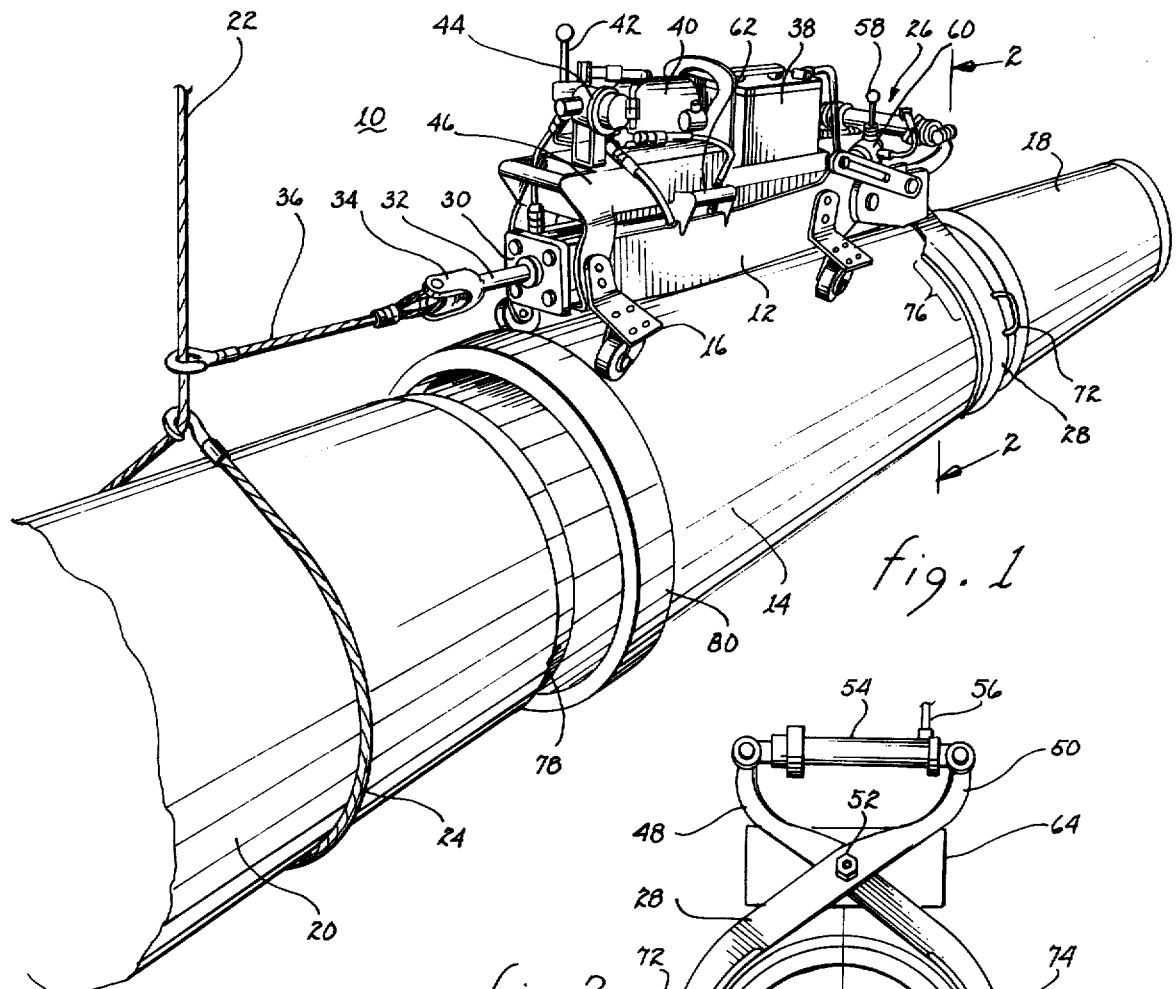
FIG. 1 is a perspective view of the pipe laying apparatus constructed in accordance with the teachings of the present invention.

Referring to FIG. 1, pipe laying apparatus 10 includes an elongated frame 12 which is movably positioned on the upper surface of pipe section 14 by four wheel means or wheel assemblies, such as wheel assembly 16.

The installation of pipe sections 14 and 18 has already been completed so that they are resting on the bottom surface of the trench. Due to the weight of each section and their contact with the earth, sections 14 and 18 are relatively immovable.

A crane (not shown) supports adjacent pipe section 20 by cable 22 which is securely attached to pipe section 20 at its center of gravity so that it can be readily maintained in a level position. Due to the friction between lower portion 24 of cable 22 against the outer surface of pipe 20, cable 22 will resist longitudinal movement along the outer surface of pipe 20.

Pipe encircling means 26 is attached to the rear end of pipe laying apparatus 10. Scissor clamp 28 secures pipe laying apparatus 10 to pipe section 14 and prevents fore-and-aft longitudinal movement along section 14.

Hydraulic ram 30 is rigidly attached to elongated frame 12. Hydraulic ram 30 includes an extendable and retractable shaft 32 and clevis 34. Cable or attachment means 36 is coupled between clevis 34 and cable 22.

Wet cell battery 38 provides power to an electrically driven hydraulic pump 40. Lever 42 and valve 44 actuate pump 40 to selectively direct the flow of hydraulic fluid under pressure to hydraulic ram 30 which causes shaft 32 to either extend or retract. Hydraulic reservoir 46 provides a source of hydraulic fluid for pump 40.

Figure 2:
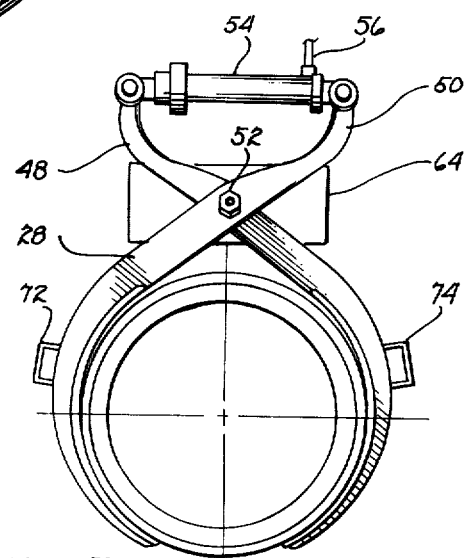
FIG. 2 is a cross-sectional view of the scissor clamp of the present invention shown in FIG. 1, taken along section line 2—2.

Referring to FIGS. 1 and 2, scissor clamp 28 is fabricated from first element 48 and second element 50 which are joined together by securing means 52 to form a hinge or pivot point about which scissor clamp 28 opens and closes. Hydraulic cylinder 54, shown in FIG. 2 in the closed position, is coupled between the upper ends of elements 48 and 50. Hydraulic cylinder 54 receives hydraulic fluid through hose 56 from hydraulic pump 40. Lever 58 operates valve 60 and energizes pump 60 in order to control the flow of hydraulic fluid to hydraulic cylinder 54.

Hydraulic cylinder 54, when in the closed position, lightly biases scissor clamp 28 to the closed position; it is not intended to cause scissor clamp 28 to exert a high level of force against the outer diameter of pipe section 14.

When hydraulic cylinder 54 is fully extended, elements 48 and 50 of scissor clamp 28 pivot about securing means 52, causing the jaws of the clamp to open. When in the open position, scissor clamp 28 can be rotated upwardly to the semi-horizontal position shown in FIG. 3. In this position pipe laying apparatus 10 can be readily rolled along the upper surface of a pipe section. A handle 62 is provided on each side of pipe laying apparatus 10 to enable an operator to more easily roll the apparatus after completing the task of positioning a pipe section.

Figure 3:
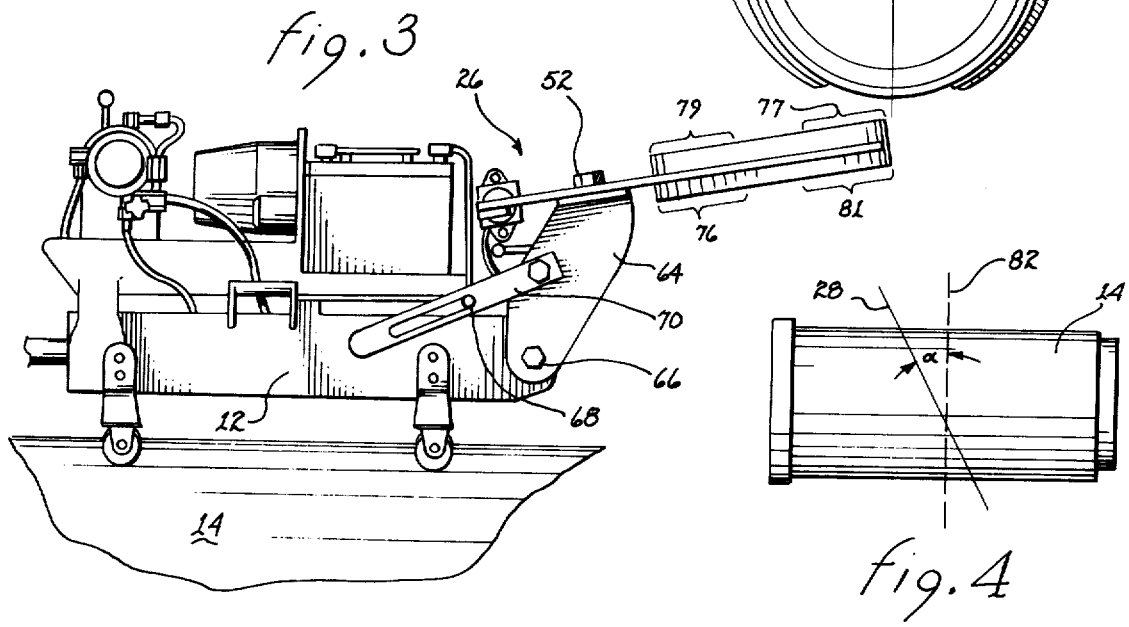
FIG. 3 is a side view of the pipe laying apparatus shown in FIG. 1 with the scissor clamp in a semi-horizontal retracted position.

Referring now to FIG. 3, securing means 52 attaches pipe encircling means 26 to bracket 64. Bracket 64 is pivotably attached to elongate frame 12 by pin 66. Pipe encircling means 26 is shown in the semi-horizontal retracted position. It is maintained in this retracted position by pin 68 which slips into a notch in slide bar 70. When the operator wishes to lower pipe encircling means 26 into position, he merely raises the lower left-hand end of slide bar 70 so that pin 68 is removed from the notch therein and manually lowers pipe encircling means 26 around the periphery of the pipe section. Handles 72 and 74 on the outer periphery of elements 48 and 50 of scissor clamp 28 facilitate the raising and lowering of pipe encircling means 26.

To move adjacent sections of pipe into abutting contact, pipe laying apparatus 10 is positioned on top of pipe section 14 which has previously been installed. While pipe encircling means 26 is in the semi-horizontal position, lever 58 is actuated to cause hydraulic cylinder 54 to expand, thereby opening the clamping portion of scissor clamp 28. An operator grasps open scissor clamp element 50 by handle 72, releases slide bar 70 and lowers pipe encircling means 26 into a position nearly perpendicular to the longitudinal axis of pipe secton 14. The operator activates lever 58 which energizes hydraulic pump 40 and directs hydraulic fluid to hydraulic cylinder 54, causing it to retract and close elements 48 and 50 of scissor clamp 28 around approximately two hundred seventy degrees of the outer circumference of pipe section 14. Lever 58 is released which traps pressurized hydraulic fluid in hydraulic cylinder 58, lightly biasing it in the closed position. This trapped hydraulic fluid in cylinder 58 lightly biases the inner surfaces of scissor clamp 28 against the outer surface of pipe section 14. Releasing lever 58 deenergizes hydraulic pump 40.

Figure 4:
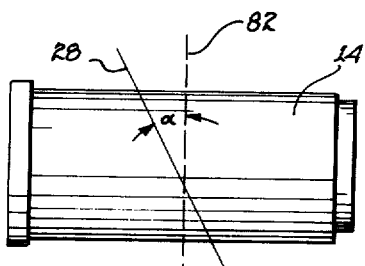
FIG. 4 is a side view of the pipe laying apparatus shown in FIG. 1 further illustrating the angled relationship between the scissor clamp and pipe section.

Cable 22 suspends pipe section 20 about its center of gravity. A crane operator lowers pipe section 20 into the trench to bring its end section 78 within about 4 inches of end fitting 80 of pipe section 14. At this point the operator of pipe laying apparatus 10 attaches cable 36 to cable 22. He activates lever 42 which energizes hydraulic pump 40 and causes the shaft 32 of hydraulic ram 30 to slowly retract. Initially, pipe laying apparatus 10 will be drawn very slightly toward cable 22. This slight displacement of pipe laying apparatus 10 causes scissor clamp 28 to be tilted at an angle which is about 15°-20° displaced from the vertical axis of pipe 14. FIG. 4 best shows this offset angle which is formed between vertical axis 82 of pipe section 14 and scissor clamp 28. This tilting causes the upper leading edge surfaces, such as surface 76 of elements 48 and 50, to dig or wedge into the outer surface of pipe section 14. Lower trailing edge surfaces, such as surface 77 of elements 48 and 50, dig into the outer surface of pipe section 14 in a direction opposite to the upper leading edge surfaces and upper trailing edge surfaces, such as surface 79. Lower leading edge surfaces, such as surface 81, angle out away from the outer surface of pipe section 14. In this manner scissor clamp 28 wedges into the outer surface of pipe section 14 to lock pipe laying apparatus 10 into a fixed position along pipe section 14.

At this point the longitudinal movement of pipe laying apparatus 10 ceases and the retracting shaft 32 of hydraulic ram 30 applies a tension via cables 36 and 22 to pipe section 20 which results in longitudinal movement of pipe section 20 toward pipe section 14. This longitudinal movement eventually results in tapered end 78 of pipe section 20 sliding within end fitting 80 of pipe section 14. After pipe sections 20 and 14 have been brought into longitudinal abutting contact, the operator reverses the position of lever 42 which causes shaft 32 of hydraulic ram 30 to extend. This releases the tension on cable 36 so that it can be removed from cable 22. The operator repositions lever 58 which causes hydraulic cylinder 54 to extend, resulting in the opening of scissor clamp 28. The operator grasps handle 72 and swings the pipe encircling means 26 upward and into the locked position illustrated in FIG. 3. The operator grips pipe laying apparatus 10 by handle 62 and moves it over end fitting 80 and onto pipe section 20. The procedure is then repeated for the next newly laid segment of pipe.

It will be apparent to those skilled in the art that the disclosed pipe laying apparatus may be modified in numerous ways and may assume various embodiments other than the preferred embodiments specifically set out and described above. Accordingly, it is intended by the appended claims to cover all such modifications of the invention which fall within the true spirit and scope of the invention.

What is claimed is:

1. In a pipe laying apparatus for temporary attachment to a horizontally oriented section or pipe for inhibiting relative longitudinal movement between said apparatus and said pipe, the combination comprising:
   a. an elongated frame, having a longitudinal axis, positionable on the top surface of said pipe section with the longitudinal axis of said frame generally parallel to the longitudinal axis of said pipe section;
   b. pipe encircling means having a pair of substantially coplanar arms for at least partially surrounding the outer circumference of said pipe section;
   c. securing means for pivotably securing said pipe encircling means to said frame about an axis substantially perpendicular to the longitudinal axis of said frame;
   d. tilting means for applying a longitudinal force to said frame for tilting the plane of said pipe encircling means relative to the vertical axis of said pipe section to force said pipe encircling means into engagement with the outer circumference of said pipe section;
   e. locking means coupled to each of said pair of arms for locking said pair of arms in a partially surrounding portion with respect to said pipe section; whereby said pair or arms of said pipe encircling means wedge against the outer surface of said pipe section and prevent relative longitudinal movement between said apparatus and said pipe section.

2. The apparatus of claim 1 wherein said pipe encircling means includes a scissor clamp having first and second arms coupled together by a hinge.

3. The apparatus of claim 2 wherein said locking means further includes biasing means for lightly biasing said pair of arms against the outer circumference of said pipe section.

4. The apparatus of claim 3 wherein said frame further includes wheel means rotatably mounted on said frame to permit positioning of said frame along the top surface of said pipe section.

5. The apparatus of claim 4 wherein said tilting means includes:
   a. a hydraulic ram mounted on said frame and having an extendable and retractable shaft for displacing said shaft along an axis substantially parallel to the longitudinal axis of said frame;
   b. attaching means secured to said shaft for attaching said shaft to an adjacent pipe section;
   c. pump means mounted on said frame for supplying hydraulic fluid under pressure to said hydraulic ram and to said biasing means, said ram responsive to the receipt of hydraulic fluid under pressure for retracting said shaft to impart longitudinal motion to said attaching means for urging said adjacent pipe section into longitudinal abuting contact with said pipe section.

6. The apparatus according to claim 5 wherein said pump means includes an electrically powered hydraulic pump and a storage battery for supplying energy to said hydraulic pump.

7. The apparatus of claim 6 wherein said first and second arms include upper and lower ends, and wherein said biasing means includes a double action hydraulic cylinder coupled to receive hydraulic fluid under pressure from said hydraulic pump, said double action hydraulic cylinder being positioned between and connected to the upper ends of said first and second arms for alternately opening and closing said scissor clamp and baising said first and second arms of said scissor clamp against the outer circumference of said pipe section.

8. The apparatus of claim 7 wherein said adjacent pipe section is suspended about its center of gravity by a first cable, and wherein said attaching means includes a second cable having a first end linked to said shaft and a second end linked to said first cable.

9. The apparatus of claim 8 wherein said pump means further includes a hydraulic fluid reservoir for storing hydraulic fluid.

10. The apparatus of claim 9 wherein said first and second arms of said scissor clamp include first and second apertures, and wherein said hinge includes a threaded shaft extending through the first and second apertures and said first and second arms are secured to said shaft by a bolt.

* * * * *